(12) United States Patent
Dixon et al.

(10) Patent No.: US 9,575,308 B2
(45) Date of Patent: Feb. 21, 2017

(54) SLIDE SCANNER WITH DYNAMIC FOCUS AND SPECIMEN TILT AND METHOD OF OPERATION

(71) Applicant: Huron Technologies International Inc., Waterloo (CA)

(72) Inventors: Arthur Edward Dixon, Waterloo (CA); Savvas Damaskinos, Kitchener (CA)

(73) Assignee: Huron Technologies International Inc., Waterloo, ON (CA)

(*) Notice: Subject to any disclaimer, the term of this patent is extended or adjusted under 35 U.S.C. 154(b) by 161 days.

(21) Appl. No.: 14/387,457

(22) PCT Filed: Mar. 21, 2013

(86) PCT No.: PCT/CA2013/000267
§ 371 (c)(1),
(2) Date: Sep. 23, 2014

(87) PCT Pub. No.: WO2013/138911
PCT Pub. Date: Sep. 26, 2013

(65) Prior Publication Data
US 2015/0054921 A1    Feb. 26, 2015

Related U.S. Application Data

(60) Provisional application No. 61/614,977, filed on Mar. 23, 2012.

(51) Int. Cl.
G02B 21/36    (2006.01)
G02B 21/26    (2006.01)
G02B 21/00    (2006.01)
G02B 21/12    (2006.01)
G02B 21/16    (2006.01)

(52) U.S. Cl.
CPC .......... *G02B 21/365* (2013.01); *G02B 21/006* (2013.01); *G02B 21/008* (2013.01); *G02B 21/0076* (2013.01); *G02B 21/26* (2013.01); *G02B 21/12* (2013.01); *G02B 21/16* (2013.01)

(58) Field of Classification Search
CPC .... G02B 21/26; G02B 21/006; G02B 21/0076
USPC ...................................... 348/46, 79
See application file for complete search history.

(56) References Cited

U.S. PATENT DOCUMENTS

| | | | | |
|---|---|---|---|---|
| 6,133,986 A * | 10/2000 | Johnson | ............. | G02B 21/0028 355/43 |
| 6,169,289 B1 * | 1/2001 | White | ................ | G01N 21/6458 250/458.1 |
| 6,590,645 B1 * | 7/2003 | Chen | ................... | G01N 21/8851 257/E21.528 |
| 6,640,014 B1 * | 10/2003 | Price | ..................... | G02B 21/241 358/408 |

(Continued)

*Primary Examiner* — Nguyen Truong
(74) *Attorney, Agent, or Firm* — Daryl W. Schnurr

(57) ABSTRACT

An instrument and method for scanning large microscope specimen on a specimen holder has a scanning optical microscope that is configured to scan the specimen in one of brightfield and fluorescence. The specimen is dynamically tillable about a scan direction during a scan to maintain focus along the length of each scan line as the scan proceeds. A three dimensional image of the specimen can be obtained wherein the specimen tilt and relative focus are maintained from a first image contour to a second image contour through a thickness of a specimen.

14 Claims, 10 Drawing Sheets

(56) References Cited

U.S. PATENT DOCUMENTS

| | | | | |
|---|---|---|---|---|
| 6,711,283 | B1* | 3/2004 | Soenksen | G02B 21/002 |
| | | | | 382/128 |
| 7,095,032 | B2* | 8/2006 | Montagu | G01N 21/6428 |
| | | | | 250/458.1 |
| 2005/0110986 | A1* | 5/2005 | Nikoonahad | G01N 21/94 |
| | | | | 356/237.2 |
| 2005/0285049 | A1* | 12/2005 | Montagu | G01N 21/6428 |
| | | | | 250/458.1 |
| 2011/0006231 | A1* | 1/2011 | Betzig | G01J 9/00 |
| | | | | 250/578.1 |

\* cited by examiner

SLIDE SCANNER WITH DYNAMIC FOCUS AND SPECIMEN TILT AND METHOD OF OPERATION

BACKGROUND OF THE INVENTION

Field of the Invention

This invention relates to the fields of microscopic imaging of large specimens with particular emphasis on brightfield and fluorescence imaging. Applications include imaging tissue specimens, genetic microarrays, protein arrays, tissue arrays, cells and cell populations, biochips, arrays of biomolecules, detection of nanoparticles, photoluminescence imaging of semiconductor materials and devices, and many others. More particularly, this invention relates to an instrument and method for scanning a large microscope specimen in brightfield or fluorescence with a scanning optical microscope and tilting the specimen about a scan direction during a scan to maintain focus along a length of each scan as the scan proceeds.

Description of the Prior Art

Several technologies are used for imaging large specimens at high resolution. Tiling microscopes record an image of a small area of the specimen using a digital camera (usually a CCD camera), the specimen is moved with a computer-controlled microscope stage to image an adjacent area, an image of the adjacent area is recorded, the stage is moved again to the next area, and so on until a number of image tiles have been recorded that together cover the whole area of the specimen. Images of each area (image tiles) are recorded when the stage is stationary, after waiting long enough for vibrations from the moving stage to dissipate, and using an exposure time that is sufficient to record the fluorescence images. These image tiles can be butted together, or overlapped and stitched using computer stitching algorithms, to form one image of the entire specimen. Such images may contain tiling artifacts caused by different focus positions for adjacent tiles. For large specimens, thousands of tiles may be required to image the entire specimen, requiring many changes in focus which increase the chances of tiling artifacts.

Strip scanning instruments are often used for imaging large specimens on microscope slides. In these instruments infinity-corrected microscope optics are used, with a high Numerical Aperture (high NA) microscope objective and a tube lens of the appropriate focal length to focus an image of the specimen directly onto a CCD or CMOS linear array sensor or TDI sensor, and with the correct magnification to match the resolution of the microscope objective with the detector pixel size for maximum magnification in the digitized image {as described in "Choosing Objective Lenses: The Importance of Numerical Aperture and Magnification in Digital Optical Microscopy", David W. Piston, Biol. Bull. 195, 1-4 (1998)}. A linear CCD detector array with 1000 or 2000 pixels is often used, and three separate linear detectors with appropriate filters to pass red, green and blue light are used for RGB brightfield imaging. A high Numerical Aperture 20× microscope objective is often used, with a 1 mm field of view. The sample is moved at constant speed in the direction perpendicular to the long dimension of the linear detector array to scan a narrow strip across a microscope slide. The entire slide can be imaged by imaging repeated strips and buffing them together to create the final image. Another version of this technology uses TDI (Time Delay and Integration) array sensors which increase both sensitivity and imaging speed. In both of these instruments, exposure is varied by changing illumination intensity and/or scan speed.

Such a microscope is shown in FIG. 1 (Prior Art). A tissue specimen 100 (or other specimen to be imaged) mounted on microscope slide 101 is illuminated from below by illumination source 110. Light passing through the specimen is collected by infinity-corrected microscope objective 115 which is focused on the specimen by piezo positioner 120. The microscope objective 115 and tube lens 125 form a real image of the specimen on linear detector array 130. An image of the specimen is collected by moving the microscope slide at constant speed in scan direction 102 along the Y direction using motorized stage 105 in a direction perpendicular to the long dimension of the detector array 130, combining a sequence of equally-spaced line images from the array to construct an image of one strip across the specimen. Strips are then assembled to form a complete image of the specimen.

For brightfield imaging, most strip-scanning instruments illuminate the specimen from below, and detect the image in transmission using a sensor placed above the specimen. In brightfield, signal strength is high, and red, green and blue channels are often detected simultaneously with separate linear detector arrays to produce a colour image.

A prior art strip-scanning microscope for fluorescence imaging is shown in FIG. 2. A tissue specimen 200 (or other fluorescent specimen to be imaged) mounted on microscope slide 101 is illuminated from above by illumination source 201. In fluorescence imaging the illumination source is usually mounted above the specimen (epifluorescence) so that the intense illumination light that passes through the specimen is not mixed with the weaker fluorescence emission from the specimen, as it would be if the illumination source were below the specimen. Several different optical combinations can be used for epifluorescence illumination—including illumination light that is injected into the microscope tube between the microscope objective and the tube lens, using a dichroic beamsplitter to reflect it down through the microscope objective and onto the specimen. In addition, a narrow wavelength band is chosen for the illumination light to match the absorption peak of the fluorophore in use. Fluorescence emitted by the specimen is collected by infinity-corrected microscope objective 115 which is focused on the specimen by piezo positioner 120. Emission filter 205 is chosen to reject light at the illumination wavelength and to pass the emission band of the fluorophore in use. The microscope objective 115 and tube lens 125 form a real image of the specimen on a TDI detector array 210. An image of the specimen is collected by moving the microscope slide at constant speed in scan direction 102 along the y direction using motorized stage 105 in a direction perpendicular to the long dimension of the detector array 210, combining a sequence of equally-spaced, time-integrated line images from the array to construct an image of one strip across the specimen. Strips are then assembled to form a complete image of the specimen. When a CCD-based TDI array is used, each line image stored in memory is the result of integrating the charge generated in all of the previous lines of the array while the scan proceeds, and thus has both increased signal/noise and amplitude (due to increased exposure time) when compared to the result if a linear array detector were used.

A description of strip scanning instruments, using either linear arrays or TDI arrays, is given in US Patent Application Publication #US2009/0141126 A1 ("Fully Automatic Rapid Microscope Slide Scanner", by Dirk Soenksen).

When either linear arrays or TDI arrays are used for scanning a tissue specimen, focus is maintained along the scan strip by moving microscope objective 115 with piezo positioner 120. A focus map for each strip is created before scanning with measurements at several positions along the strip and focus is maintained by the piezo positioner in accordance with the focus map; or automatic focus is achieved during scanning using a separate detector or focus-measuring device. One measurement of best focus position for autofocusing a point scanner (or one using a linear array detector) was described in "Autofocusing for wide field-of-view laser scanning imaging systems", G. Li, S. Damaskinos & A. Dixon, Scanning 28(2), 74-75 (2006). This paper describes the use of an X-Z image acquired at each of several focus points on the specimen to produce a best focus position by segmenting the X-Z image along X and calculating a best focus position for each segment. The result of a best linear fit for these focus positions is used as the line of best focus. In the Y direction, the best focus is determined by a best linear fit to focus positions calculated for various Y locations. Spatial-domain intensity-gradient-based solutions were found to work better than spatial-frequency-domain-based solutions.

If the specimen is not flat, or the specimen is tilted about the scan direction, proper focus may not be achieved across the whole width of the strip. In addition, focus at the edge of adjacent strips may be different, making it difficult to stitch image strips together to assemble a complete image of the specimen without focus mismatch at the edge of strips. These problems are made worse when magnification is increased (which decreases depth of field) and when the width of the scan strip on the specimen is increased.

FIG. 3 shows one embodiment of a prior art confocal scanning laser macroscope, as described in U.S. Pat. No. 5,760,951. In this embodiment, the incoming collimated laser beam 302 from laser 300 passes through a beam expander (comprised of lens 304 and lens 306), and is expanded to match the diameter of entrance pupil 312 of laser scan lens 314 (note—entrance pupil 312 as indicated on the figure simply indicates the position of the entrance pupil. A real stop is not placed at this position). Scanning mirror 310 deflects the beam in the X direction. Laser scan lens 314 focuses the beam to spot 316 on (or inside) specimen 318, mounted on microscope slide 101, and light reflected from or emitted by the specimen is collected by laser scan lens 314, descanned by scanning mirror 310, and partially reflected by beamsplitter 308 into a confocal detection arm comprised of laser rejection filter 330, lens 332, pinhole 334, and detector 336. Detector 336 is located behind pinhole 334. Light reflected back from focused spot 316 on specimen 318 passes through pinhole 334 and is detected, but light from any other point in the specimen runs into the edges of the pinhole and is not detected. The scan mirror is computer-controlled to raster the focused spot across the specimen. At the same time, microscope slide 101, which is mounted on a computer-controlled, motor-driven scanning stage 105, moves slowly in the Y direction. The combination of rapid beam scanning across the specimen while it is moved slowly in the perpendicular Y direction results in a raster-scan motion of focused-laser spot 316 across specimen 318. A computer, represented by computer screen 340, is connected to detector 336 to store and display a signal from detector 336. The computer provides means for acquiring, manipulating, displaying and storing the signal from the detector. This confocal macroscope has properties similar to those of a confocal scanning laser microscope, except that the field of view of the microscope is much smaller. Both confocal scanning laser microscopes and macroscopes are often called "spot scanners" or "point scanners", since they both function by scanning a focused spot or point of light across the specimen in a raster scan.

The instrument shown in FIG. 3 has the ability to adjust the gain of the detector depending on the fluorescence intensity of the fluorophore, and a high-speed preview scan can be used to predict the gain required for each fluorophore before scanning the final high-resolution image (see PCT application WO 2009/137935 A1). In addition, because the laser scan lens has a wide field of view, large specimens can be scanned in a few wide strips, making it possible to scan very large specimens (up to 6×8 inches in size in one version of a commercial instrument). Best focus is measured at several positions in the scan (Y) direction, and focus is maintained dynamically during scan. In one version of this instrument, specimen tilt was measured at several positions on the specimen, and an average value was used to adjust specimen tilt using a tilting specimen stage, using the same value of tilt across the entire specimen. This combination was very effective for thin tissue specimens and low resolution imaging (1 micron pixels or larger) but higher resolution (including the use of higher numerical-aperture scan lenses) and thick specimens will require a better solution.

Several other technologies are used for fluorescence imaging of large specimens. With tiling microscopes, the image of a small area of the specimen is recorded with a digital camera (usually a CCD camera), the specimen is moved with a computer-controlled microscope stage to image an adjacent area, an image of the adjacent area is recorded, the stage is moved again to the next area, and so on until a number of image tiles have been recorded that together cover the whole area of the specimen. Images of each area (image tiles) are recorded when the stage is stationary, after waiting long enough for vibrations from the moving stage to dissipate, and using an exposure time that is sufficient to record the fluorescence images. These image tiles can be butted together, or overlapped and stitched using computer stitching algorithms, to form one image of the entire specimen.

When tiling microscopes are used for fluorescence imaging, the areas surrounding each tile and the overlapping edges of adjacent tiles are exposed twice (and the corners four times) which can bleach some fluorophores. Exposure is adjusted by changing the exposure time for each tile. If multiple fluorophores are imaged, a different exposure time is required for each, so each fluorophore requires a separate image at each tile position. Multiple exposure of the specimen for imaging multiple fluorophores can also increase bleaching of the fluorophores.

DEFINITIONS

For the purposes of this patent document, a "large microscope specimen" (or "macroscopic specimen") is defined as one that is larger than the field of view of a compound optical microscope containing a microscope objective that has the same Numerical Aperture (NA) as that of the scanner described in this document.

For the purposes of this patent document, "TDI" or "Time Delay and Integration" is defined as the method and detectors used for scanning moving objects consisting of a CCD- or CMOS-based TDI detector array and associated electronics. In a CCD-based TDI array, charge is transferred from one row of pixels in the detector array to the next in synchronism with the motion across the stationary detector array of a real image of the moving object. As the image moves, charge builds up and the result is charge integration just as if a longer exposure were used to image a stationary object. When an object position in the moving real image (and integrated charge) reaches the last row of the array, that line of pixels is read out. In operation, the image of the moving specimen is acquired one row at a time by sequentially reading out the last line of pixels on the detector. This line of pixels contains the sum of charge transferred from all previous lines of pixels collected in synchronism with the image moving across the detector. One example of such a camera is the DALSA Piranha TDI camera. In a CMOS-based TDI detector, voltage signals are transferred instead of charge.

For the purposes of this patent document, "fluorescence" includes single-photon excitation and multi-photon excitation {and other microscopies based on nonlinear interactions (for example second and third harmonic generation and coherent anti-Stokes Raman scattering (CARS) microscopies)} and photoluminescence; and "specimen" includes but is not limited to tissue specimens, genetic microarrays, protein arrays, tissue arrays, cells and cell populations, biochips, arrays of biomolecules, plant and animal material, insects and semiconductor materials and devices. Specimens may be mounted on or contained in any kind of specimen holder.

An "object contour" is a planar or non-planar surface in the specimen (often just below the surface) that corresponds to the focus and tilt required to maintain focus along a scan line across the width of a scan strip of a specimen. An "object line" is a line in the object contour which corresponds to an "image line" on which a real image of the object line is formed. When a linear detector is used, the image detected by the detector is a "line image". In a point-scanning instrument, a "line image" is detected for each scan of the focused spot along the object line.

"Dynamic tilt" is defined as tilting the specimen about the scan direction in order to maintain lateral focus across the width of a scan strip, where the degree of tilt varies during scan to maintain lateral focus.

The "scan direction" is the direction of stage motion during scanning (the Y-direction in all drawings).

OBJECTS OF THE INVENTION

1. It is an object of this invention to provide an instrument and method of scanning a large microscope specimen on a glass microscope slide (or other specimen holder) in brightfield using a point-scanning optical macroscope or microscope by dynamically tilting the specimen about the scan direction during scan such that focus can be maintained along the length of each scan line (the width of the scan strip) as the scan proceeds.
2. It is an object of this invention to provide an instrument and method of scanning a large microscope specimen on a glass microscope slide (or other specimen holder) in fluorescence using a point-scanning optical macroscope or microscope by dynamically tilting the specimen about the scan direction during scan such that focus can be maintained along the length of each scan line (the width of the scan strip) as the scan proceeds.
3. It is an object of this invention to provide an instrument and method of scanning a large microscope specimen on a glass microscope slide (or other specimen holder) in multi-photon fluorescence using a point-scanning optical macroscope or microscope where illumination is provided by a short-pulse light source (usually a femtosecond laser) and by dynamically tilting the specimen about the scan direction during scan such that focus can be maintained along the length of each scan line (the width of the scan strip) as the scan proceeds.
4. It is an object of this invention to provide an instrument and method of scanning a large microscope specimen on a glass microscope slide (or other specimen holder) using a linear detector array by dynamically tilting the specimen about the scan direction during scan such that focus can be maintained across the width of the scan strip as the scan proceeds.
5. It is an object of this invention to provide an instrument and method of scanning a large microscope specimen on a glass microscope slide (or other specimen holder) for fluorescence imaging using a TDI detector array and dynamically tilting the specimen about the scan direction during scan such that focus can be maintained across the width of the scan strip as the scan proceeds.
6. It is an object of this invention to provide an instrument and method of scanning a large microscope specimen on a glass microscope slide (or other specimen holder) for fluorescence imaging using a 2D detector array and Moving Specimen Image Averaging and dynamically tilting the specimen about the scan direction during scan such that focus can be maintained across the width of the scan strip as the scan proceeds.
7. It is an object of this invention to provide an instrument and method of scanning a large microscope specimen in which both focus and tilt are adjusted dynamically during scan.
8. It is an object of this invention to provide an instrument and method of scanning a large microscope specimen in which focus and tilt of adjacent scan strips are adjusted dynamically during scan such that the edges of adjacent strips are acquired at the same focus positions to prevent focus mismatch at the edges of adjacent strips.
9. It is an object of this invention to provide a method of measuring the focus and specimen tilt required before scanning such that focus and specimen tilt are maintained dynamically relative to the specimen and across the width of the scan strip, and focus is matched at the edges of adjacent scan strips as the scan proceeds.
10. It is an object of this invention to provide an instrument and method of scanning a large microscope specimen on a glass microscope slide to capture a three dimensional image of the specimen in which specimen tilt and relative focus position are maintained from one object contour to the next through the thickness of the specimen.

SUMMARY OF THE INVENTION

An instrument for scanning a large macroscope specimen on a specimen holder comprises a scanning optical microscope that is configured to scan the specimen in one of brightfield and fluorescence. The specimen is dynamically tiltable about a scan direction during a scan to main focus along a length of each scan line as the scan proceeds.

A method of scanning a large microscope specimen on a specimen holder comprises using a scanning optical microscope that is configured to scan in one of brightfield and fluorescence and dynamically tilting the specimen about a scan direction during a scan while maintaining focus along the length of each scan line as the scan proceeds.

DESCRIPTION OF THE INVENTION

Figure 4:
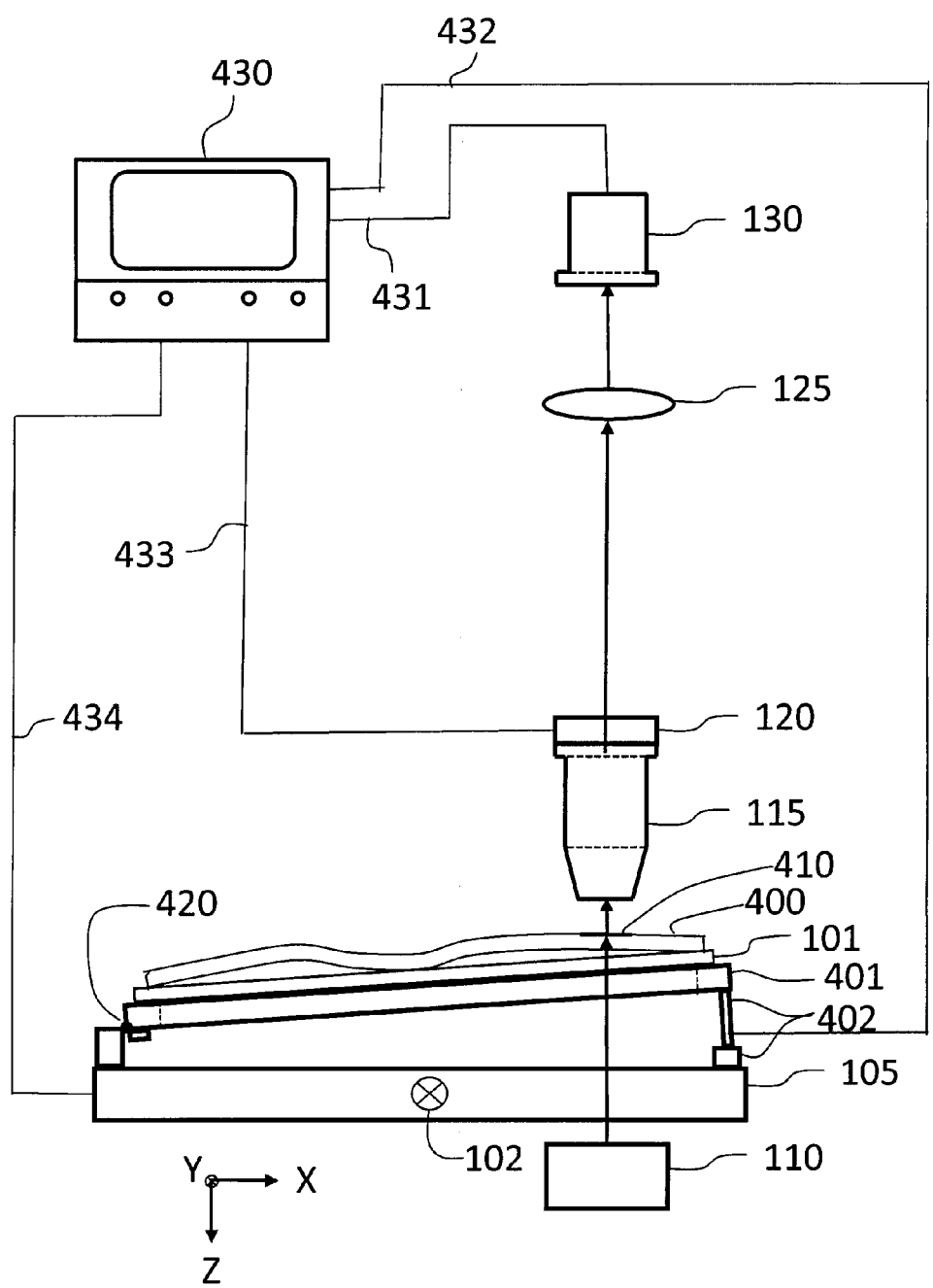
FIG. 4 is a schematic view of a brightfield microscope slide scanner using a linear detector array and providing dynamic focus and dynamic specimen tilt that is a first embodiment of this invention.

FIG. 4 shows a schematic representation of a brightfield scanner that performs simultaneous focus and specimen tilt adjustments during scanning that is a first embodiment of this invention. A large tissue specimen 400 (or other specimen to be imaged) is mounted on microscope slide 101 which is held by slide mount 401. Slide mount 401 is supported on the left by hinge 420 (which rotates about the Y axis) and on the right by piezoelectric positioner 402, which moves in the Z direction. Slide mount 401 is open in the centre (like a picture frame) to allow the microscope slide to be illuminated from below by illumination source 110. Light passing through the specimen is collected by infinity-corrected microscope objective 115 which is focused on the specimen by piezo positioner 120, controlled by computer 430 through control cable 433. The computer 430 can be any central processing unit. The microscope objective 115 and tube lens 125 form a real image of the specimen on linear detector array 130. Data from detector 130 is collected by computer 430 through cable 431. An image of the specimen is collected by moving the microscope slide at constant speed in scan direction 102 along the Y direction (perpendicular to the long dimension of detector array 130) using motorized stage 105, controlled by computer 430 through control cable 434, acquiring a sequence of equally-spaced line images from the array to construct an image of one strip across the specimen with strip width equal to the length of an object line 410. When one strip is imaged, motorized stage 105 moves the specimen in the X direction a distance equal to the strip width, and a second strip is scanned. This procedure is repeated until the entire area of the specimen (or the area of interest) has been scanned. Strips are then assembled to form a complete image of the specimen.

In scanners using detector arrays, like the scanner shown in FIG. 4 (and FIG. 5), there are several methods of changing focus, including moving microscope objective 115 in the Z-direction using piezo positioner 120 (or other positioning mechanism), moving array detector 130 in the Z-direction, and moving microscope slide 101 in the Z-direction using a specimen stage that moves in the Z-direction. When specimen 400 is tilted using piezo positioner 402 (or other positioning mechanism), the distance between the objective lens and the specimen changes, and this change requires a simultaneous focus adjustment by computer 430 to maintain focus.

In prior art scanners, several focus positions are measured along each strip before scanning, and a focus map is produced to enable dynamic focus adjustments during scanning using piezo positioner 120 to move microscope objective 115 under computer control. When a specimen is not flat, like tissue specimen 400 in FIG. 4, it is important to maintain focus across the width of each strip (strip width is equal to the length of object line 410) and also to make sure that the edges of adjacent strips are at the same focus position. This is important because if the edges of adjacent strips are at different focus positions, it is difficult (or impossible) to match the image data at the edge of the strips, and an image artifact results. Matching adjacent strips is sometimes done by simply butting together strip edges, which requires precise knowledge of pixel positions at the edges of each strip, or by overlapping adjacent strips and using a feature-matching algorithm to align the two images. In either case, if the focus positions of the two strip edges are different, an image artifact can result in the final image. The present invention has two important advantages over prior art scanners: dynamic tilting of the specimen about the scan direction makes it possible to maintain focus across the width of the strip, and when combined with focus movements using the piezo positioner, the focus positions can be matched at the edges of adjacent strips. These advantages become more important when strip width, resolution and/or specimen thickness are increased.

Method of scanning using dynamic focus and tilt: Before scanning, a preview scan of the entire specimen is performed to find which areas of the slide are covered by the specimen, and which areas are empty. Focus and tilt data are measured automatically at several positions on the specimen by performing an X-Z scan at several Y positions along each strip of the specimen before scanning, with the specimen tilt set at zero. An X-Z scan is performed at each position by moving microscope objective 115 in the Z direction using piezo positioner 120, while storing a series of line images across the strip using the linear detector. Each line image is segmented into several line segments, and the spatial frequency of the image calculated for each segment. Since the in-focus image is that with the highest spatial frequencies and best contrast, it is possible to calculate the best focus position for each segment, which allows the tilt angle for the detector and the focus position for the microscope objective to be calculated and stored at each of several Y positions along each strip of the specimen. It is important that several segments are measured across the width of each line image, in order to ensure that all parts of the object line are in focus, and some segments of the object line are not in the air above the specimen, which could happen if focus measurements were made only at the centre and the two ends of the line. Focus and tilt are controlled simultaneously during scan by computer 430. Specimen tilt is adjusted using piezoelectric positioner 402, controlled by computer 430 through control cable 432. In addition to following the surface contours of the specimen, the focus adjustment must also correct for motion of the specimen in the Z direction as slide 101 is tilted during tilt adjustments. Both focus position and tilt are adjusted during scan to match a focal surface interpolated from the measured focus and tilt data. The focus positions of the edge of the strip can be stored and matched with the edge of the next strip when the focus and tilt measurements for that strip are performed later (or a focus and tilt surface for the entire specimen can be calculated before scanning begins). For illustrative purposes, both the thickness and surface curvature of tissue specimen 400 are exaggerated in FIG. 4. In practice, the surface of tissue specimens is usually quite flat, so that a tilt adjustment of +/−0.5 degrees is sufficient for most specimens.

Figure 5:
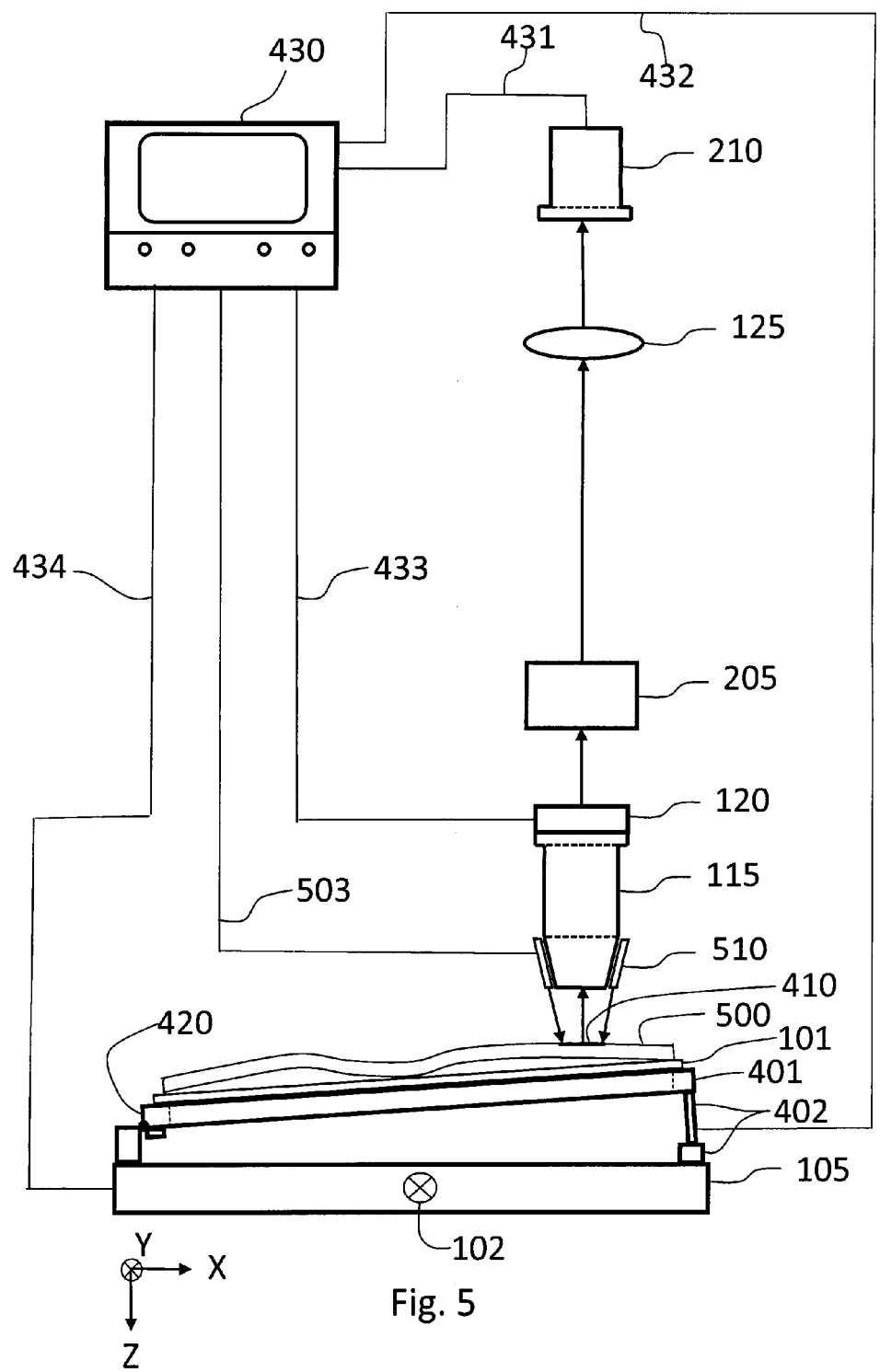
FIG. 5 is a schematic view of a fluorescence microscope slide scanner using a TDI detector array (or a 2D detector array for Moving Specimen Image Averaging) and providing dynamic focus and dynamic specimen tilt that is a second embodiment of this invention.

FIG. 5 shows a slide scanner for fluorescence imaging that is a second embodiment of this invention. A tissue specimen 500 (or other specimen to be imaged in fluorescence) mounted on microscope slide 101 which is held by slide mount 401 is illuminated from above by illumination source 510. Illumination intensity (and sometimes wavelength) is controlled by computer 430 through control cable 503. In fluorescence imaging the illumination source is usually mounted above the specimen (epifluorescence) so that the intense illumination light that passes through the specimen is not mixed with the weaker fluorescence emission from the specimen, as it would be if the illumination source were below the specimen. {Several other optical combinations can be used for epifluorescence illumination. For example, illumination light can be injected into the microscope tube between the microscope objective 115 and emission filter 205, using a dichroic beamsplitter to reflect it down through the microscope objective 115 and onto the specimen 500 (this optical combination is not shown in FIG. 5)}. A narrow wavelength band is chosen for the illumination light to match the absorption peak of the fluorophore in use. Fluorescence emitted by the specimen is collected by infinity-corrected microscope objective 115 which is focused on the specimen by piezo positioner 120. Emission filter 205 is chosen to reject light at the illumination wavelength and to pass the emission band of the fluorophore in use. The microscope objective 115 and tube lens 125 form a real image of the specimen on TDI detector array 210. The long dimension of TDI detector array 210 is perpendicular to scan direction 102 (the Y direction). Hinge 420 rotates about the Y direction, parallel to scan direction 102. An image of the specimen is collected by moving the microscope slide at constant speed using motorized stage 105 in a direction perpendicular to the long dimension of the TDI detector array 210, acquiring a sequence of equally-spaced line images from the array to construct an image of one strip across the specimen, with strip width equal to the length of object line 410. When one strip is imaged, motorized stage 105 moves the specimen in the X direction a distance equal to the strip width, and a second strip is scanned. This procedure is repeated until the entire area of the specimen (or the area of interest) has been scanned. Strips are then assembled to form a complete image. When a CCD-based TDI array is used, each line image stored in memory is the result of integrating the charge generated in all of the previous lines of the array while the scan proceeds, and thus has both increased signal/noise and amplitude (due to increased exposure time) when compared to the result from a linear array detector. In this second embodiment, computer 430 controls motorized stage 105, piezoelectric positioner 402, and piezo positioner 120, and collects data from detector array 210. In addition to controlling all of the electromechanical parts of the second embodiment scanner, it also performs all of the other functions necessary to acquire, store, process and display digital image data. When using this second embodiment scanner, in addition to automatically measuring and storing data for a focus-and-tilt map before scanning, preview scan data is also used to adjust the intensity of illumination source 510 and/or the scan speed to set the best fluorescence exposure to be used in the final scan.

Figure 6:
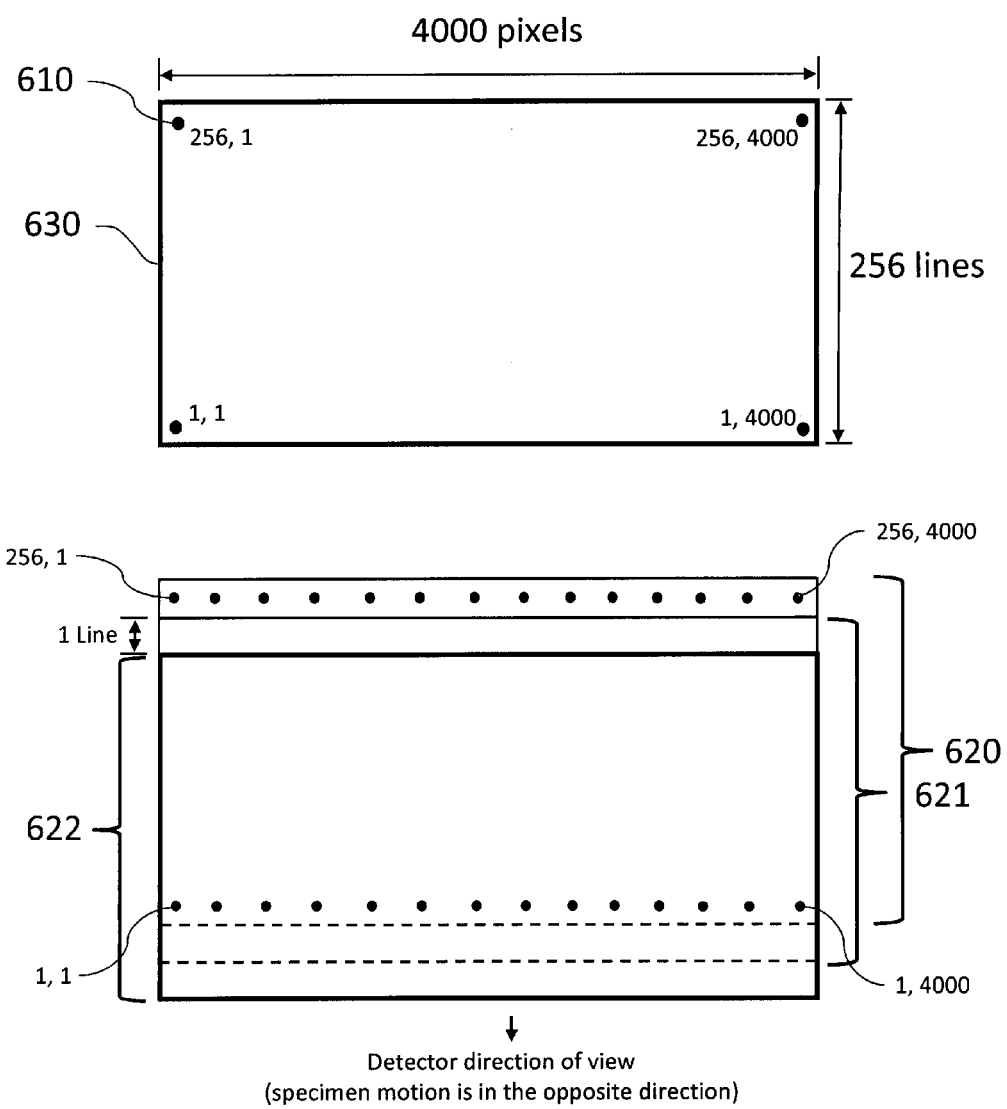
FIG. 6 shows a 256×4000 pixel detector array (top) and three sequential fields of view of the array as the specimen moves during scanning (bottom)

An instrument and method for scanning microscope slides using a CCD or CMOS two-dimensional detector array that adds intermediate image frames acquired every time the microscope slide has moved an incremental distance equal to that between rows of pixels in the final image has been described in U.S. Patent Application Ser. No. 61/427,153, "Pathology Slide Scanner", by A. E. Dixon. The instrument described in that application has the advantages of a slide scanner that uses a TDI array, but uses ordinary CCD or CMOS (or other technology) two-dimensional arrays instead. In addition, since the final image is the sum of a large number of intermediate image frames, each intermediate frame being displaced a distance equal to the distance between rows of pixels in the final image, it can have a larger dynamic range than that supported by the detector array, and this increased dynamic range enables multiple fluorophores to be imaged simultaneously using separate detector arrays for each fluorophore, with adjustment for the emission strength (brightness of the image from each fluorophore) after scan is complete. Each line in the final image is the result of adding several exposures of the same line using sequential adjacent lines of pixels in the detector array and then dividing by the number of exposures, or adding the data from each exposure to a data set with a larger dynamic range. For example, 256 exposures of each object line using an 8-bit detector can be added into a 16-bit image store. FIG. 6 shows a 256×4000 pixel detector array 630 (top) and the motion of the field-of-view of the array as the stage moves the specimen during scan (bottom). During the scan, intermediate image 620 is stored in computer 430. Then, after the specimen has moved a distance equal to the distance between rows of pixels in the final image, intermediate image 621 is added to data in the computer, shifted by one row of pixels, followed by intermediate image 622, and so on. Using the array shown in FIG. 6, each pixel in the final strip image stored in computer 430 is the sum of 256 exposures of the same pixel position in the specimen. In this particular example, if the frame grabber produces 8-bit images, the resulting stored image has a dynamic range of 16 bits (each pixel is made up of a sum of 256 exposures where each exposure has a maximum value of 255). The final image will have an exposure time that is 256 times larger than that achieved at the same scan speed using a linear detector array, which is a major advantage when imaging weak fluorophores. This technique is called Moving Specimen Image Averaging (MSIA), and for the purposes of this patent document, this is the definition of Moving Specimen Image Averaging. The fluorescence image of the specimen strip being scanned is stored and adjacent strip images are assembled to produce a final image of the entire specimen. Adjacent strips may be assembled by butting them together, or by collecting overlapping strip images and using feature-matching software for registration.

In FIG. 5, if TDI detector array 210 is replaced by an ordinary two-dimensional (2D) detector array (not a TDI array), then Moving Specimen Image Averaging can be used to acquire fluorescence image strips as described above. This is a third embodiment of this invention. Both focus position and tilt can be measured by performing a Z-scan at several Y positions along each strip before scanning, with the specimen tilt set at zero. With the detector parallel to the scan plane, a Z-scan is performed by moving the microscope objective in the Z direction using the piezo positioner to a series of equally-spaced positions in Z, while storing the resulting series of 2D images, each of which has the same width as the scan strip, using the 2D detector (or alternatively, a Z-scan can be performed by moving either the detector or the specimen in the Z direction). This results in a 3D image stack at each Y position, and if the detector used as an example in the description above is used, this image stack contains 256×4000×N pixels, where N is the number of positions in Z at which an exposure is made. Each of the long, thin images in the stack can be segmented into several short segments, and the spatial frequency of the image calculated for each segment. Since the in-focus image is that with the highest spatial frequencies and best contrast, it is then possible to calculate the best focus position for each segment, which allows the tilt angle for the detector and the focus position for the microscope objective to be calculated and stored at each of several Y positions along the strip. This procedure is repeated for several positions in the scan (Y) direction, and the results used to calculate a focus and tilt surface to be used while scanning. Both focus position and tilt can be adjusted during scanning so that the final image matches the focus and tilt surface. The focus positions of the edge of the strip can be stored using and matched with the edge of the next strip when the focus and tilt measurements for that strip are measured later. This focus and tilt surface can be used for imaging by controlling specimen tilt about the scan direction and microscope objective focus position.

A scanner using Moving Specimen Image Averaging has a major cost advantage over one using a TDI detector, since ordinary 2D arrays are much less expensive than TDI arrays, and the electronic signals for controlling MSIA exposures are usually available from the stage controller used for controlling stage motion in a scanning stage microscope. The same detector used for scanning can be used for measuring focus and tilt to produce a focus and tilt map of the strip before scanning, and a 3D image of a region of interest can be acquired by using the instrument as a tiling microscope. When used as a tiling microscope, the exposure time can be set to whatever time is required for the fluorophore being imaged, since it is not set by the scan speed as it is while scanning along the length of the strip.

Figure 7:
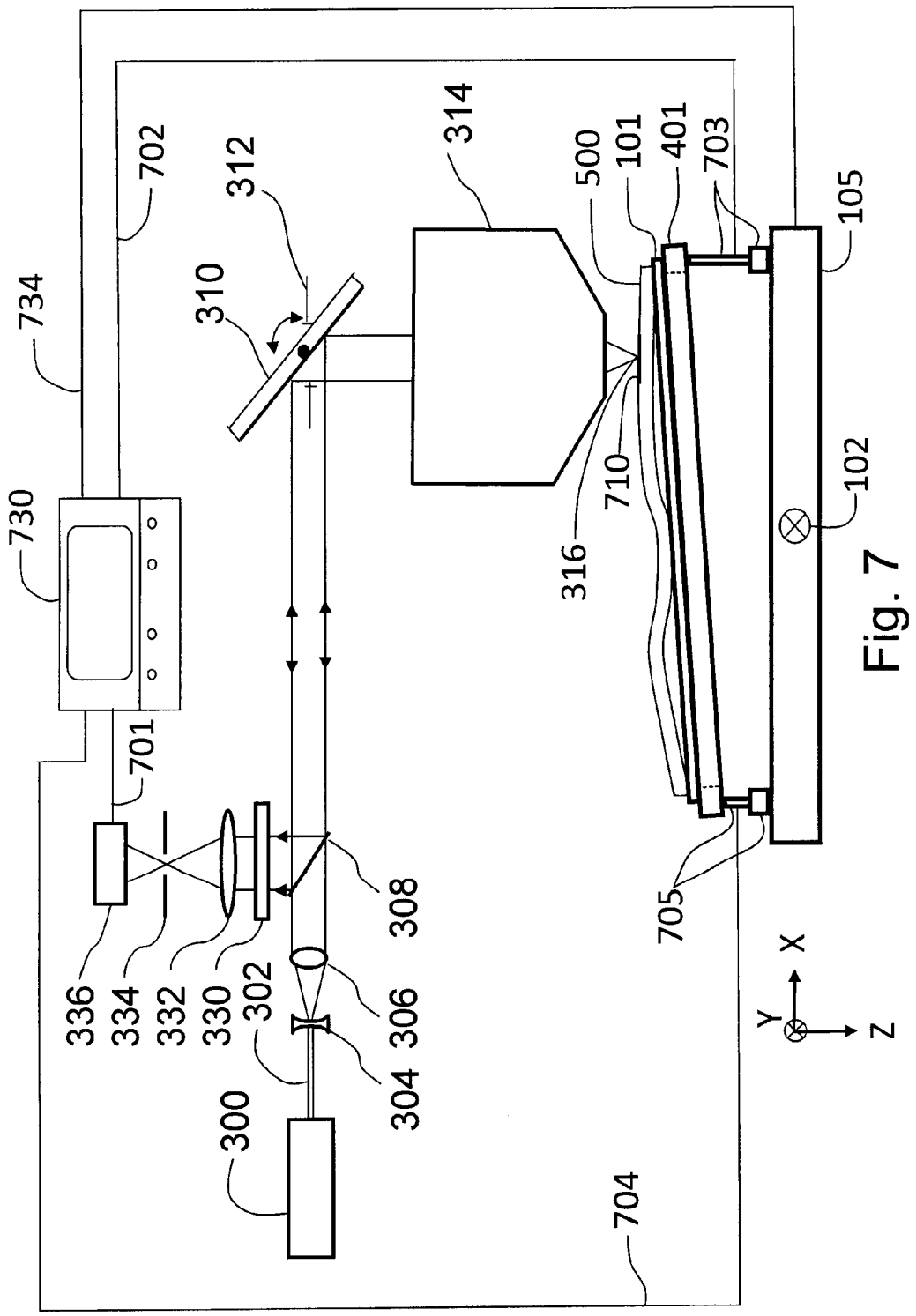
FIG. 7 is a schematic view of a confocal scanning laser macroscope providing dynamic focus and dynamic specimen tilt that is a third embodiment of this invention.

FIG. 7 is a schematic view of a confocal scanning laser macroscope providing dynamic focus and dynamic specimen tilt that is a third embodiment of this invention. The incoming collimated light beam 302 from laser 300 (or other narrow band light source) passes through a beam expander (comprised of lens 304 and lens 306), and is expanded to match the diameter of entrance pupil 312 of laser scan lens 314 (Note that entrance pupil 312 as indicated on the Figure simply indicates the position of the entrance pupil. A real stop is not placed at this position). Scanning mirror 310 deflects the beam in the X direction. Laser scan lens 314 focuses the beam to spot 316 at the surface of or inside specimen 500, which is mounted on microscope slide 101, and light reflected from or emitted by the specimen is collected by laser scan lens 314, descanned by scanning mirror 310, and partially reflected by beamsplitter 308 into a confocal detection arm comprised of laser rejection filter 330, lens 332, pinhole 334, and detector 336. Detector 336 is located behind pinhole 334. Light reflected back from focused spot 316 on (or inside) specimen 318 passes through pinhole 334 and is detected, but light from any other point in the specimen runs into the edges of the pinhole and is not detected. The scan mirror 310 and scanning stage 105 are computer-controlled to raster the focused spot across the specimen (the control cable for the scanning mirror is not shown on the diagram; scanning stage 105 is controlled through control cable 734). Focused spot 316 scans a line 710 on the specimen, with length equal to the width of the scan strip in the final image.

Microscope slide 101 is mounted on slide mount 401, which is supported on the left side by piezo positioner 705 and on the right side by piezo positioner 703. Piezo positioners 703 and 705 are controlled by computer 730 through control cable 702 and 704 respectively. When both piezo positioners 703 and 705 are extended at the same time, slide mount 401 moves up, changing the focus of the instrument. When piezo positioners 703 and 705 are extended one-at-a-time, the tilt of slide mount 401 is changed. Computer 730 simultaneously controls the extension of piezo positioners 703 and 705 through control cables 702 and 704 to make changes in both specimen tilt and instrument focus. (Note that other several other combinations can be used to achieve the same purpose. For example, small Z-stages have been substituted for piezo positioners 703 and 705, and voice coils have also been used in place of piezo positioners 703 and 705. A tilting mechanism like that shown in FIG. 4 can also be used, mounted on a Z-stage. Focus of scan lens 314 can also be adjusted by changes in the intermediate optics, as described in U.S. Pat. No. 7,218,446 (2007), "Imaging System having a Fine Focus", A. E. Dixon, Savvas Damaskinos and Brian C. Wilson.)

Microscope slide 101, which is mounted on computer-controlled, motor-driven scanning stage 105 controlled by computer 730 through control cable 734, moves slowly in the Y direction. The combination of rapid beam scanning across the specimen while it is moved slowly in the perpendicular Y direction results in a raster-scan motion of focused-laser spot 316 across specimen 500. A computer, represented by computer screen 730, is connected to detector 336 through control cable 701 to store and display the signal from detector 336. The computer provides means for acquiring, manipulating, displaying and storing the signal from the detector.

As described earlier, it is important to maintain focus across the width of the scan strip, and a focus and tilt map of the specimen is calculated before scanning by measuring focus and tilt using an XZ image at several positions along each scan strip, and matching focus at the strip edges to produce a focus surface to be used during scan. When this confocal instrument is used for recording confocal slices, the same focus surface is used for each slice, translated in the Z direction a distance equal to the distance between slices (this is also true for confocal or multiphoton image slices obtained using the scanning microscopes and macroscopes described in FIGS. 8, 9 and 10).

Figure 8:
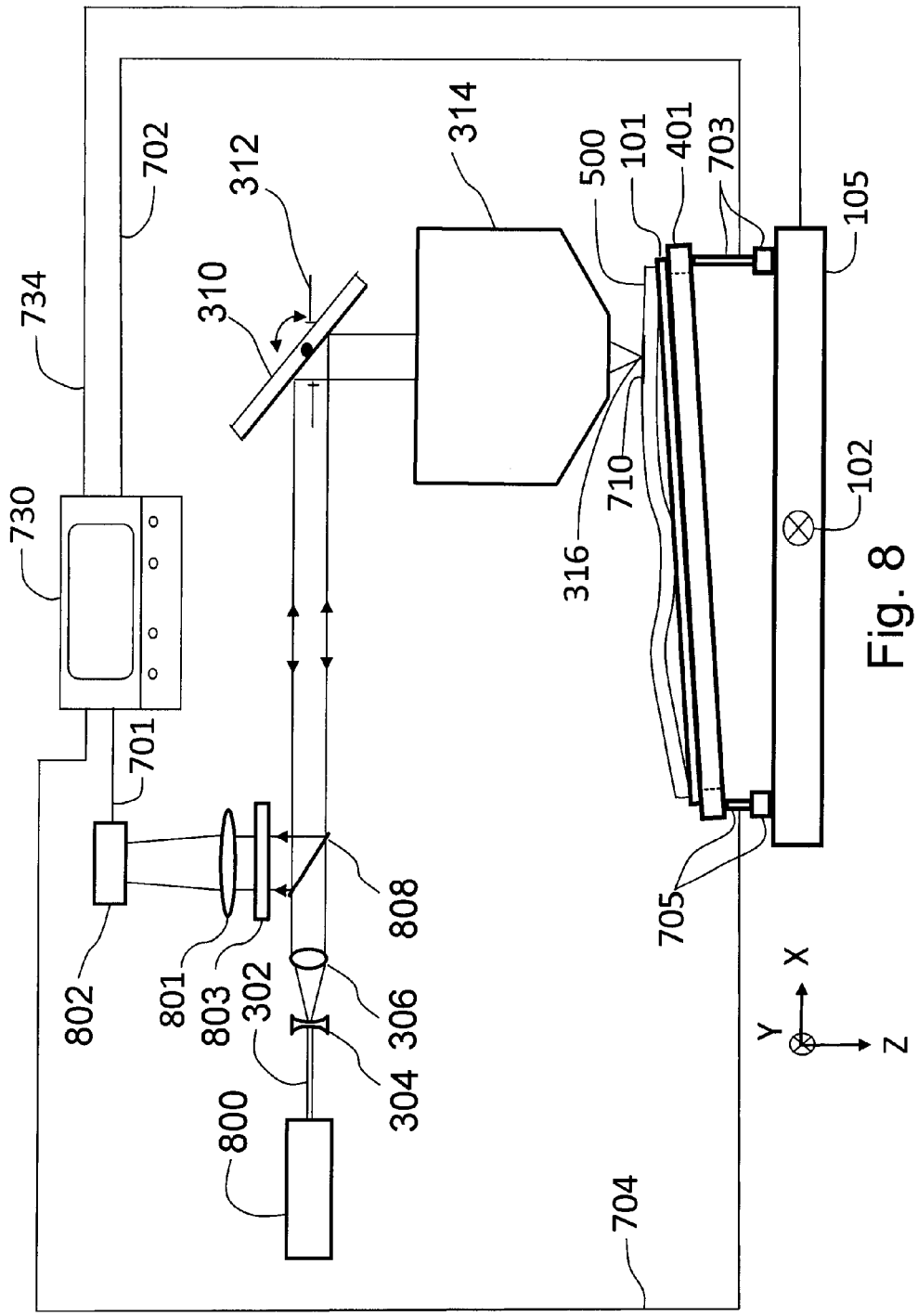
FIG. 8 is a schematic view of a two-photon (or multi-photon) fluorescence scanning macroscope providing dynamic focus and dynamic specimen tilt that is a fourth embodiment of this invention.

FIG. 8 is a schematic view of a two-photon (or multi-photon) fluorescence scanning macroscope providing dynamic focus and dynamic specimen tilt that is a fourth embodiment of this invention. In this embodiment a light source 800 produces a beam of short pulses of light (from a femtosecond laser, for example) that is expanded and passes through a dichroic beamsplitter 808 towards scanning mirror 310 and is focused to a spot 316 on or inside specimen 500. In multi-photon imaging, the fluorescence emitted from the specimen has a shorter wavelength than the excitation light source, and this returning light is reflected by dichroic beamsplitter 808 into a detection arm comprised of an emission filter 803 (chosen to transmit a fluorescence emission band and to reject the excitation wavelength), collection lens 801 and detector 802. In multi-photon imaging, fluorescence is excited by the high illumination intensity that occurs only at the focus spot 316, which enables this instrument to acquire a series of planes in depth, similar to those acquired by the confocal macroscope (the third embodiment). Beam scanning and specimen motion is the same as that already described for the confocal macroscope shown in FIG. 7. Two-photon (or multi-photon) fluorescence is particularly useful because it provides both intrinsic 3D resolution and optical sectioning, and often provides better depth penetration in scattering media (like tissue) than confocal fluorescence.

Dynamic focus and dynamic tilt as described in this fourth embodiment will also be useful for second and third harmonic generation microscopy, and coherent anti-Stokes Raman scattering microscopy (CARS microscopy), in both scanning microscope and scanning macroscope configurations. Dynamic focus and dynamic tilt will also be useful in a scanning laser microscope used for two-photon or multi-photon fluorescence, and second and third harmonic generation microscopy.

Figure 9:
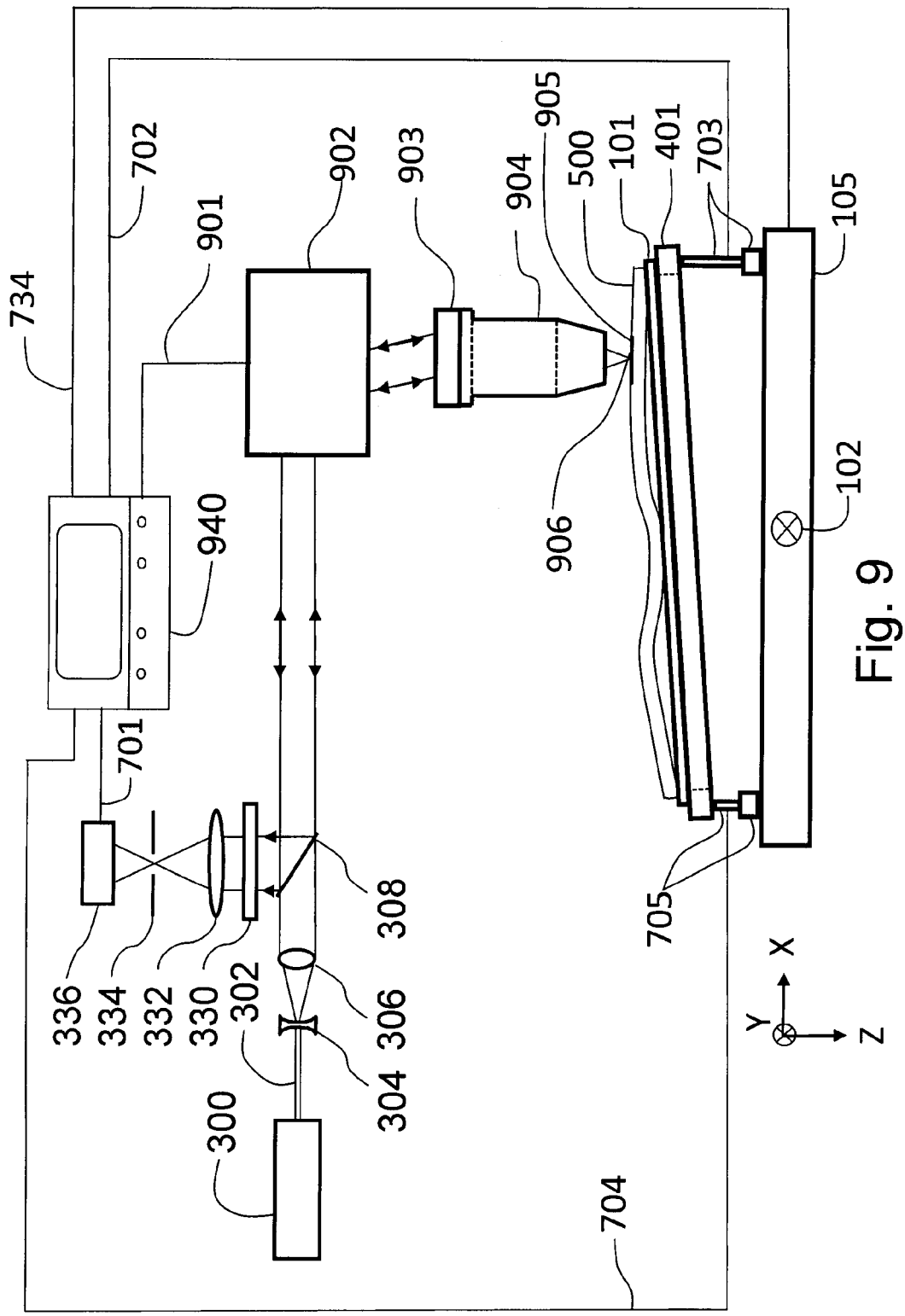
FIG. 9 is a schematic view of a scanning-beam/scanning-stage confocal microscope providing dynamic focus and dynamic specimen tilt that is a fifth embodiment of this invention.

When used for two-photon or multi-photon fluorescence, either a descanned detector where emission light is descanned by the scanning mirror (as shown in FIG. 8) or beam scanner (as shown in FIG. 9) or a non-descanned detector (where light is not descanned by the scanning mirror) can be used. In one arrangement, a non-descanned detector is placed below the microscope slide to receive fluorescence transmitted through the slide. A description of non-descanned detection is shown in "Multi-Photon Molecular Excitation in Laser-Scanning Microscopy" by W. Denk et al (p. 535-545) in "Handbook of Confocal Microscopy", Third Edition, edited by James Pawley (2006).

FIG. 9 is a schematic view of a scanning-beam/scanning-stage confocal microscope providing dynamic focus and dynamic specimen tilt that is a fifth embodiment of this invention. This confocal microscope is a variant of the confocal macroscope shown in FIG. 7, in which the scanning mirror 310 has been replaced by a beam scanner 902 and scan lens 314 has been replaced by an infinity-corrected microscope objective 904. Beam scanner 902 is comprised of a scanning mirror and a unitary telescope to translate the scanning beam from the scanning mirror to the entrance pupil of microscope objective 904. Beam scanner 902 is controlled by computer 940 through control cable 901. In this embodiment tilt adjustments are made by moving piezoelectric positioners 703 and 705, and focus is accomplished by moving the microscope objective 904 with piezo positioner 903. The incoming light beam is focused to spot 906 at specimen 500, with a scan width 905 that is smaller than scan width 710 of scan lens 314 in FIG. 7. The development of low magnification, high NA microscope objectives has increased the field of view of microscope objectives used in confocal scanning laser microscopes, and the combination of higher resolution and larger scan width makes simultaneous adjustment of focus and specimen tilt necessary in some applications, especially in whole-slide imaging.

Figure 1:
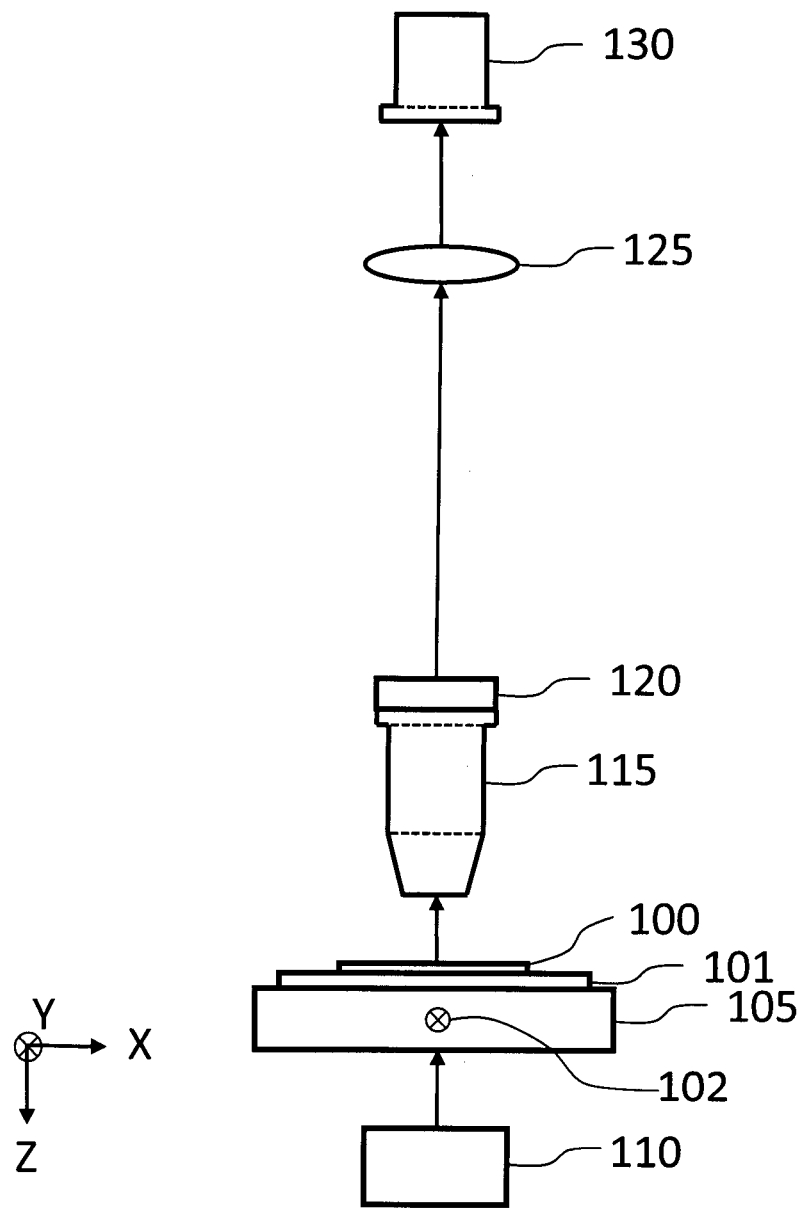
FIG. 1 is a schematic view of a prior art brightfield microscope slide scanner using a linear detector array.
Figure 2:
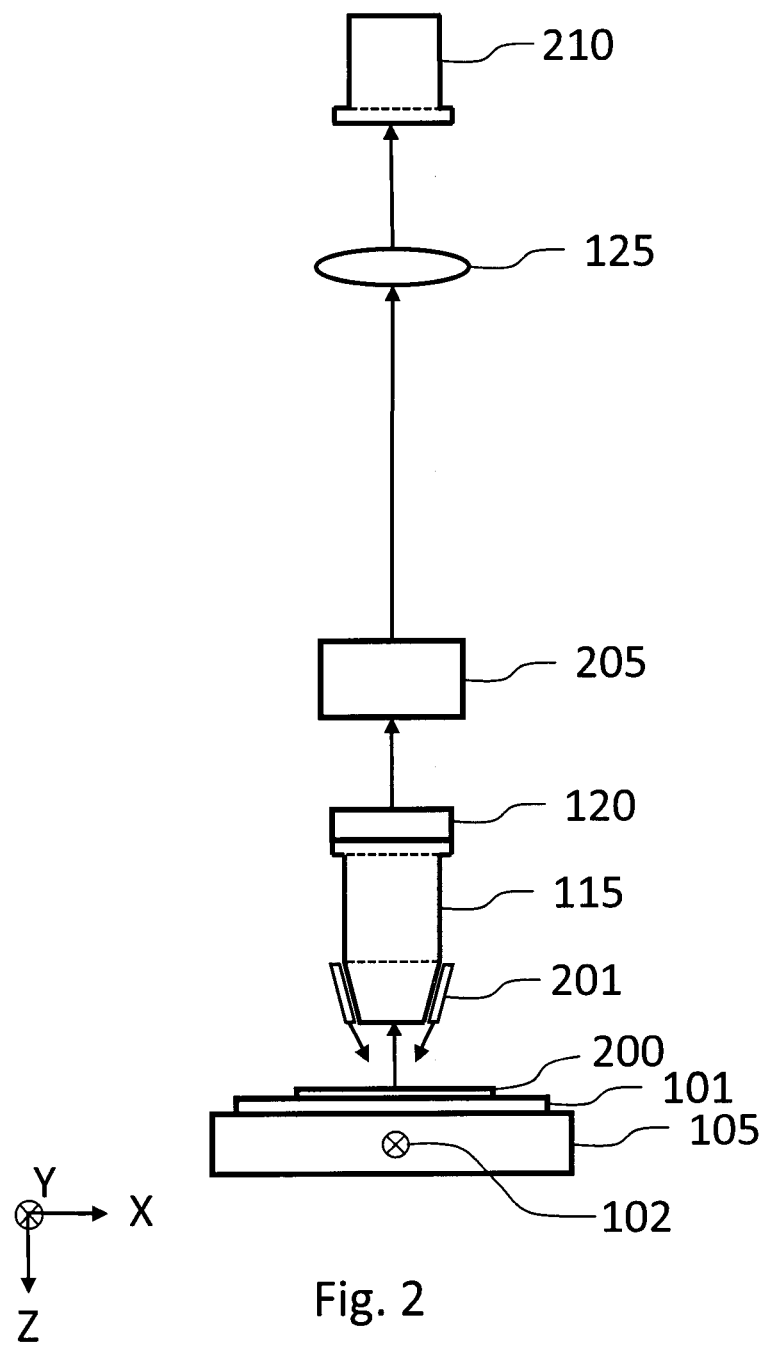
FIG. 2 is a schematic view of a prior art fluorescence microscope slide scanner using a TDI detector array.
Figure 3:
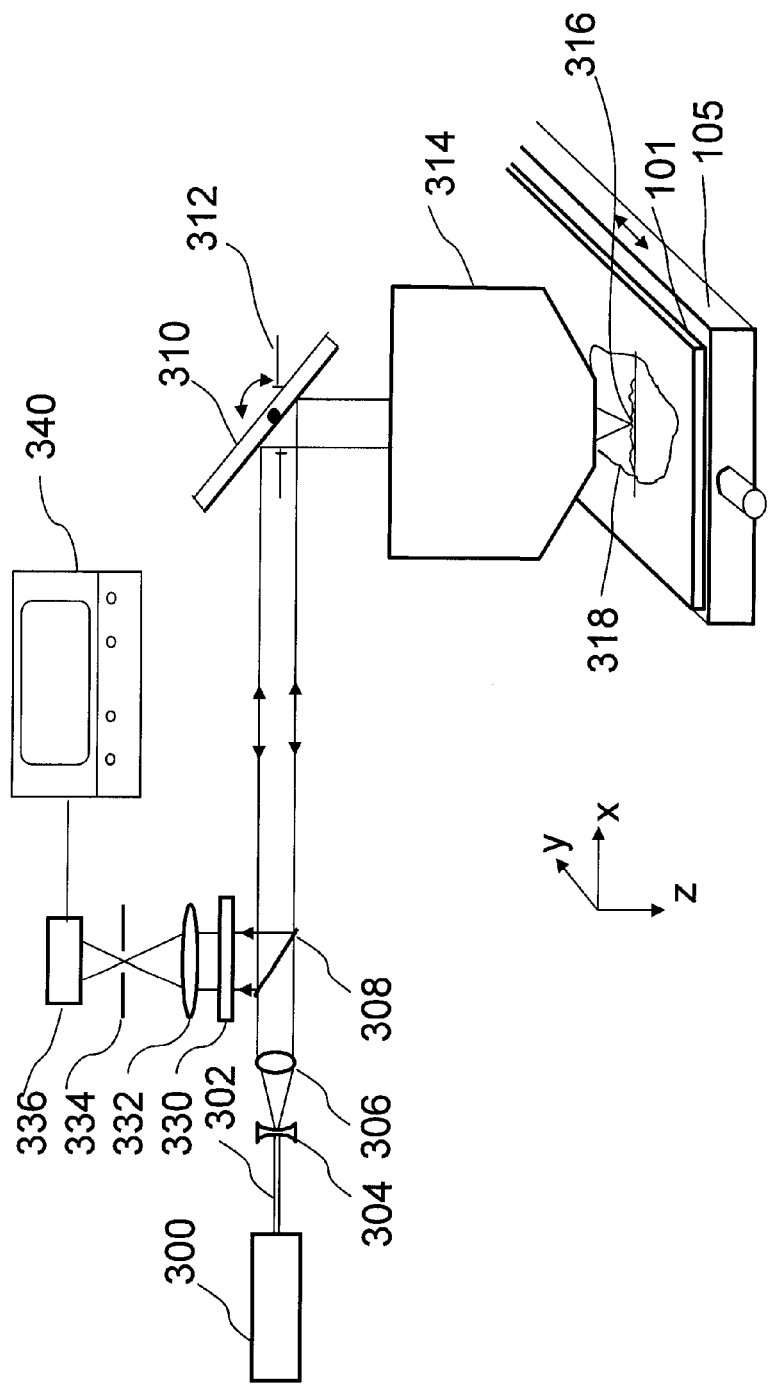
FIG. 3 is a schematic view of a prior art confocal scanning laser macroscope.
Figure 10:
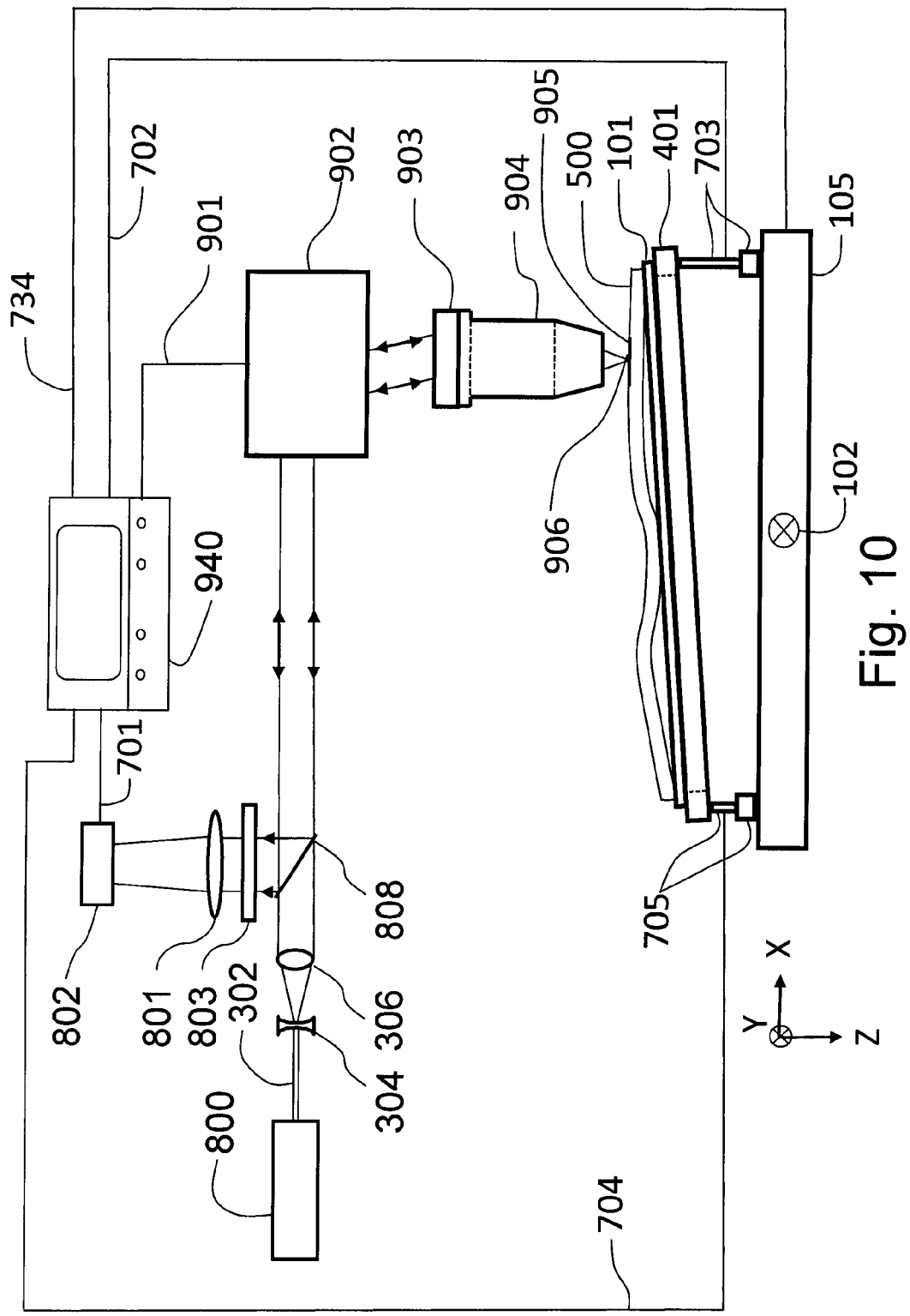
FIG. 10 is a schematic view of a two-photon (or multi-photon) fluorescence scanning-beam/scanning-stage microscope providing dynamic focus and dynamic specimen tilt that is a sixth embodiment of this invention.

FIG. 10 is a schematic view of a two-photon (or multi-photon) fluorescence scanning-beam/scanning-stage microscope providing dynamic focus and dynamic specimen tilt that is a sixth embodiment of this invention. In this embodiment a light source 800 (a femtosecond laser, for example) produces a beam of short pulses of light that is expanded and passes through a dichroic beamsplitter 808 towards scanner 902 and is focused to a spot 906 at specimen 500. In multi-photon imaging, the fluorescence emitted from the specimen has a shorter wavelength than the excitation light source, and this returning light is reflected by dichroic beamsplitter 808 into a detection arm comprised of an emission filter 803 (chosen to transmit a fluorescence emission band and to reject the excitation wavelength), collection lens 801 and detector 802. In multi-photon imaging, fluorescence is excited by the high illumination intensity that occurs only at the focus spot 906, which enables this instrument to acquire a series of image contour s in depth, similar to those acquired by the confocal microscope (the fifth embodiment). Beam scanning and specimen motion is the same as that already described for the confocal macroscope shown in FIG. 7. Two-photon (or multi-photon) fluorescence is particularly useful because it provides both intrinsic 3D resolution and optical sectioning, and often provides better depth penetration in scattering media (like tissue) than confocal fluorescence. As described earlier, a non-descanned detector can be used in place of detector 808, which receives fluorescence that has been descanned by scanner 902. The same reference numerals are used in FIGS. 4 to 10 as those used in FIGS. 1 to 3 for those components that are identical.

The instrument configuration described in this sixth embodiment will also be useful for second and third harmonic generation microscopy, with appropriate changes to the illumination source.

We claim:

1. An instrument for scanning a large microscope specimen on a specimen holder, the instrument comprising a scanning optical microscope that is configured to scan the specimen in one of brightfield and fluorescence, the specimen being dynamically tiltable about a scan direction during a scan to maintain focus along a length of each scan line as the scan proceeds, a two dimensional detector array receiving data from the scan using Moving Specimen Image Averaging.

2. The instrument as claimed in claim 1 wherein the specimen holder is controlled by a computer to move the specimen relative to the two dimensional detector array, the two dimensional detector array acquiring an image frame each time the specimen has moved an incremental distance equal to a distance between rows of pixels in a final image, the detector array acquiring one image frame for each exposure, the computer creating the final image of the specimen from all of the image frames.

3. The instrument as claimed in claim 1 wherein the focus and tilt of the specimen are adjusted dynamically during the scan.

4. The instrument as claimed in claim 1 wherein the focus and tilt of the adjacent scan strips are adjusted dynamically during a scan so that edges of adjacent strips are acquired at the same focused positions to prevent a focus mis-match at the edges of the adjacent strips.

5. The instrument as claimed in claim 1 wherein the focus and tilt are maintained dynamically relative to the specimen and across a width of a scan strip, the focus being matched at edges of adjacent scan strips as the scan proceeds.

6. The instrument as claimed in claim 1 wherein a three dimensional image of the specimen is obtained in which specimen tilt and relative focus are maintained from a first image contour to a second image contour through a thickness of the specimen, the first and second image contours having an identical shape to one another and being spaced apart from one another in a focused direction.

7. The instrument as claimed in claim 1 wherein a three dimensional image of the specimen is obtained in which specimen tilt and relative focus are maintained through at least three image contours, the image contours having an identical shape to one another and being spaced apart from one another through a thickness of the specimen.

8. A method of scanning a large microscope specimen on a specimen holder, the method comprising using a scanning optical microscope that is configured to scan in one of brightfield and fluorescence and dynamically tilting the specimen about a scan direction during a scan while maintaining focus along the length of each scan line as the scan proceeds, using a two dimensional detector array and using Moving Specimen Image Averaging.

9. The method as claimed in claim 8 including the steps of using a central processing unit to control the instrument including a tilt of the specimen, configuring a central processing unit to control the instrument, the central processing unit maintaining the tilt of the specimen to remain constant during a scan of a single object line and adjusting the tilt of the specimen.

10. The method as claimed in claim 8 comprising controlling a computer to move the specimen holder and specimen relative to the two dimensional detector array, operating the two dimensional detector array to acquire an image frame each time that the specimen moves an incremental distance equal to a distance between rows of pixels in a final image, and to one image frame for each exposure, controlling the computer to create the final image from all of the image frames.

11. The method as claimed in any one of claims 8 or 9 including the step of adjusting focus and tilt dynamically during the scan.

12. The method as claimed in any one of claims 8 or 9 including the steps of adjusting focus and tilt dynamically during the scan so that edges of adjacent strips are acquired at the same focus positions to prevent a focus mis-match at the edges of the adjacent strips.

13. The method as claimed in any one of claims 8 or 9 including the steps of scanning in more than one image contour in the specimen to obtain a 3D dimensional image of the specimen on a detector.

14. The method as claimed in any one of claims 8 or 9 including the steps of obtaining a three dimensional image of the specimen by maintaining specimen tilt and relative focus from a first image contour to a second image contour through a thickness of the specimen, ensuring that the first contour and the second contour are identical to one another in shape but are spaced apart from one another.

* * * * *